United States Patent
Chin et al.

(10) Patent No.: US 9,072,071 B2
(45) Date of Patent: Jun. 30, 2015

(54) METHODS AND SYSTEMS FOR CDMA NETWORK SWITCHING NOTIFICATION IN A WIMAX NETWORK

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1877 days.

(21) Appl. No.: 12/123,400

(22) Filed: May 19, 2008

(65) Prior Publication Data
US 2009/0285186 A1   Nov. 19, 2009

(51) Int. Cl.
H04W 4/00 (2009.01)
H04W 68/12 (2009.01)

(52) U.S. Cl.
CPC ..................... H04W 68/12 (2013.01)

(58) Field of Classification Search
USPC .......................... 370/319, 338, 344
See application file for complete search history.

(56) References Cited

U.S. PATENT DOCUMENTS

| | | | |
|---|---|---|---|
| 7,298,692 B2* | 11/2007 | Hiramatsu et al. | 370/208 |
| 2003/0014358 A1 | 1/2003 | Agee et al. | |
| 2004/0131025 A1* | 7/2004 | Dohler et al. | 370/328 |
| 2005/0192011 A1* | 9/2005 | Hong et al. | 455/440 |
| 2005/0208965 A1* | 9/2005 | Nakajima | 455/552.1 |
| 2005/0276273 A1 | 12/2005 | Oprescu-Surcobe et al. | |
| 2006/0099972 A1* | 5/2006 | Nair et al. | 455/458 |
| 2007/0064728 A1* | 3/2007 | Nitta et al. | 370/466 |
| 2007/0105600 A1 | 5/2007 | Mohanty et al. | |
| 2007/0202816 A1* | 8/2007 | Zheng | 455/91 |
| 2007/0207806 A1 | 9/2007 | Shaheen | |
| 2008/0089223 A1* | 4/2008 | Wu et al. | 370/209 |
| 2008/0096584 A1 | 4/2008 | Xu et al. | |
| 2008/0205365 A1* | 8/2008 | Russell et al. | 370/341 |
| 2008/0293437 A1* | 11/2008 | Ranganathan et al. | 455/458 |
| 2009/0016265 A1* | 1/2009 | Katayama et al. | 370/328 |
| 2010/0208624 A1* | 8/2010 | Vikberg et al. | 370/259 |

FOREIGN PATENT DOCUMENTS

| | | |
|---|---|---|
| CN | 1671232 A | 9/2005 |
| JP | 2008503189 A | 1/2008 |
| WO | WO2005125110 A2 | 12/2005 |
| WO | WO2007035061 A1 | 3/2007 |

OTHER PUBLICATIONS

International Search Report and the Written Opinion—PCT/US2009/043493 International Search Authority—European Patent Office—Oct. 1, 2009.
TD S2-084280 "CS Fallback for 1xRTT", Item 8.11, 3GPP TSG SA WG2, Meeting #65, Rel-8, May 2008, Prague, Czech Republic.

(Continued)

*Primary Examiner* — Phuc Tran
(74) *Attorney, Agent, or Firm* — Charles Chesney (57) ABSTRACT

A method and apparatus for allowing a dual-mode mobile device to communicate with a CDMA network without switching from an OFDMA network are provided. For certain embodiments, an OFDMA gateway component may serve as an interface between the OFDMA network and CDMA network, detecting a CDMA message targeting the mobile device and, in response, generating an OFDMA message containing information regarding the CDMA message.

15 Claims, 11 Drawing Sheets

(56) References Cited

OTHER PUBLICATIONS

"3rd Generation Partnership Project; Technical Specification Group Core Network and Terminals; Handover Procedures (Release 7)", 3GPP TS 23.009 V7.0.0 , Mar. 2007.

IEEE 802.16 IEEE Standard for Local and metropolitan area networks, Part 16: Air Interface for Fixed Broadband Wireless Access Systems, IEEE Std. 802.16/2004 (Revision of IEEE Std. 802.16-2001), Oct. 1, 2004.

* cited by examiner

METHODS AND SYSTEMS FOR CDMA NETWORK SWITCHING NOTIFICATION IN A WIMAX NETWORK

TECHNICAL FIELD

Certain embodiments of the present disclosure generally relate to wireless communication and, more particularly, to the interfacing of two or more radio access technologies with overlaid networks.

BACKGROUND

OFDM and OFDMA wireless communication systems under IEEE 802.16x use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In order to expand the services available to subscribers, some MSs support communications with multiple radio access technologies (RATs). For example, a dual-mode MS may support WiMAX for broadband data services and code division multiple access (CDMA) for voice services.

Unfortunately, in conventional systems, inefficient switching between the two networks may cause a reduction in throughput on either service.

SUMMARY OF THE DISCLOSURE

Certain embodiments provide a method generally including monitoring a CDMA network for a CDMA message targeting the mobile device and, in response to detecting the CDMA message targeting the mobile device, notifying the mobile device of the CDMA message with an OFDMA message.

Certain embodiments provide a method generally including receiving, at an OFDMA base station servicing the mobile device, an OFDMA message containing information regarding a CDMA message sent via a CDMA network targeting the mobile device and, in response, transmitting an OFDMA message containing information regarding the CDMA message from the base station to the mobile device.

Certain embodiments provide a method generally including generating, at the mobile device, an OFDMA message containing information regarding a CDMA message targeting the CDMA network from the mobile device and transmitting the OFDMA message containing the information regarding the CDMA message from the mobile device to an OFDMA base station servicing the mobile device.

Certain embodiments provides an apparatus for communicating with a multi-mode mobile device that supports code division multiple access (CDMA) and orthogonal frequency division multiple access (OFDMA) communications. The apparatus generally includes means for monitoring a CDMA network for a CDMA message targeting the mobile device and means for notifying the mobile device of the CDMA message with an OFDMA message, in response to detecting the CDMA message targeting the mobile device.

Certain embodiments provide an apparatus for communicating with a multi-mode mobile device that supports code division multiple access (CDMA) and orthogonal frequency division multiple access (OFDMA) communications. The apparatus generally includes means for receiving a first OFDMA message containing information regarding a CDMA message sent via a CDMA network targeting the mobile device and means for transmitting, in response to receiving the first OFDMA message, a second OFDMA message containing information regarding the CDMA message to the mobile device.

Certain embodiments provide an apparatus for communicating with a code division multiple access (CDMA) network via an orthogonal frequency division multiple access (OFDMA) network. The apparatus generally includes means for generating an OFDMA message containing information regarding a CDMA message targeting the CDMA network and means for transmitting the OFDMA message containing the information regarding the CDMA message to an OFDMA base station servicing the apparatus.

Certain embodiments provide a gateway device for communicating with a multi-mode mobile device that supports code division multiple access (CDMA) and orthogonal frequency division multiple access (OFDMA) communications. The gateway device generally includes a CDMA interface for monitoring a CDMA network for a CDMA message targeting the mobile device and an OFDMA interface for notifying the mobile device of the CDMA message with an OFDMA message, in response to detecting the CDMA message targeting the mobile device.

Certain embodiments provide a base station for communicating with a multi-mode mobile device that supports code division multiple access (CDMA) and orthogonal frequency division multiple access (OFDMA) communications. The base station generally includes receiver logic for receiving a first OFDMA message containing information regarding a CDMA message sent via a CDMA network targeting the mobile device and transmitter logic for transmitting, in response to receiving the first OFDMA message, a second OFDMA message containing information regarding the CDMA message to the mobile device.

Certain embodiments provide a multi-mode mobile device capable of communicating with a code division multiple access (CDMA) network via an orthogonal frequency division multiple access (OFDMA) network. The mobile device generally includes a CDMA interface for communicating with the CDMA network control logic for generating an OFDMA message containing information regarding a CDMA message targeting the CDMA network, and an OFDMA interface for transmitting the OFDMA message containing the information regarding the CDMA message to an OFDMA base station servicing the mobile device.

Certain embodiments provide a computer-readable medium containing a program for communicating with a multi-mode mobile device that supports code division multiple access (CDMA) and orthogonal frequency division multiple access (OFDMA) communications. When executed by a processor, the program performs operations generally including monitoring a CDMA network for a CDMA message targeting the mobile device and, in response to detecting the CDMA message targeting the mobile device, notifying the mobile device of the CDMA message with an OFDMA message.

Certain embodiments provide a computer-readable medium containing a program for communicating with a multi-mode mobile device that supports code division multiple access (CDMA) and orthogonal frequency division multiple access (OFDMA) communications. When executed by a processor, the program performs operations generally including receiving, at an OFDMA base station servicing the mobile device, an OFDMA message containing information regarding a CDMA message sent via a CDMA network targeting the mobile device and, in response, transmitting an OFDMA message containing information regarding the CDMA message from the base station to the mobile device.

Certain embodiments provide a computer-readable medium containing a program for communicating with a code division multiple access (CDMA) network by a multi-mode mobile device via an orthogonal frequency division multiple access (OFDMA) network. When executed by a processor, the program generally performs operations generally including generating an OFDMA message containing information regarding a CDMA message targeting the CDMA network from the mobile device and transmitting the OFDMA message containing the information regarding the CDMA message to an OFDMA base station servicing the mobile device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure may allow a WiMAX network to serve as a message tunnel for code division multiple access (CDMA) network messaging. Certain embodiments may provide an interface between a WiMAX service access gateway (ASN-GW) and a CDMA 1x mobile switching center (MSC) for transferring page requests between the CDMA MSC and a mobile station (MS) when the MS is in a WiMAX network. For some embodiments, the interface may also serve to transfer a registration message of the MS to update the location of the MS in the CDMA network.

As a result, the techniques provided herein may help reduce the frequency with which a MS switches between CDMA 1x and WiMAX networks. Reduced switching may help improve service continuity in a dual-mode CDMA 1x and WiMAX overlay, improve the quality of broadband data service when the MS is tuned to the WiMAX network and, thus, improve user experience.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
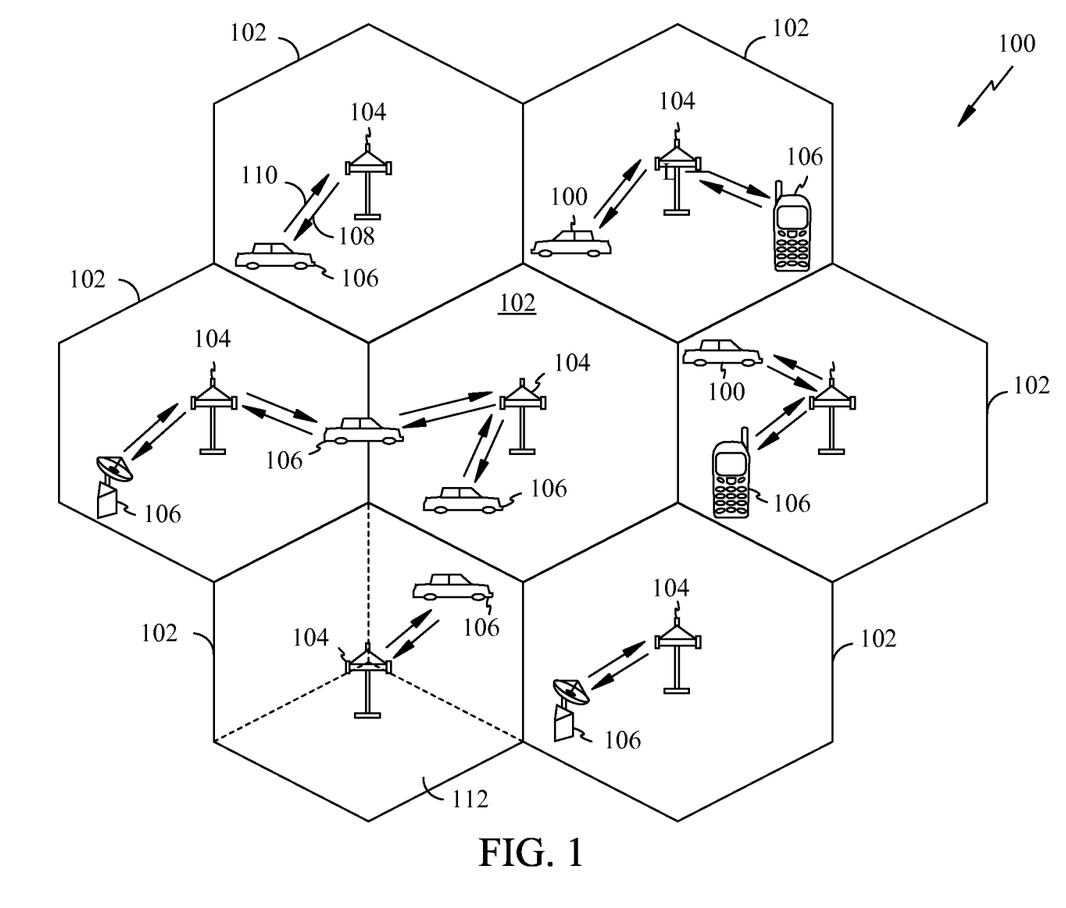
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
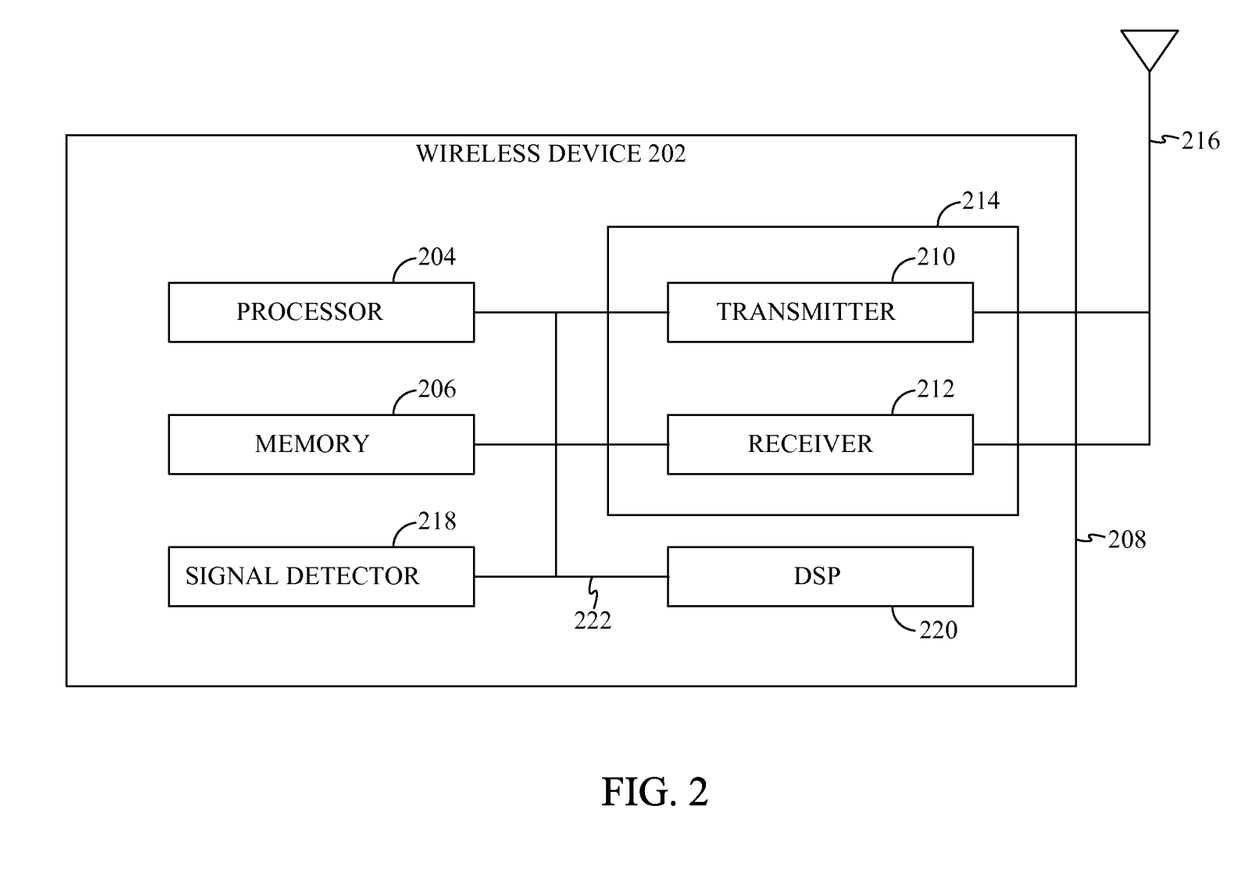
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
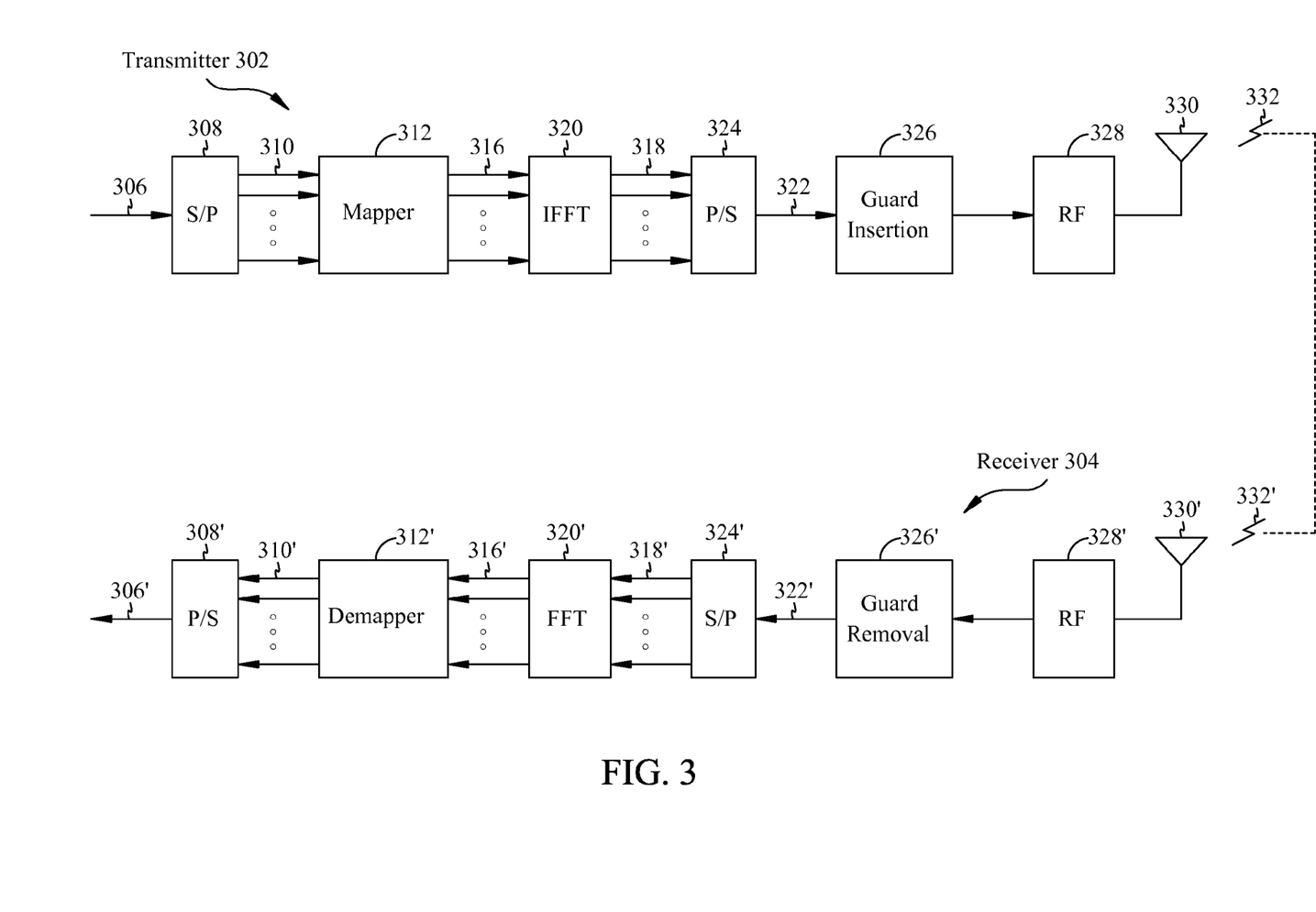
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the Nparallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

CDMA Network Switching Notification in a WiMAX Network

Figure 4:
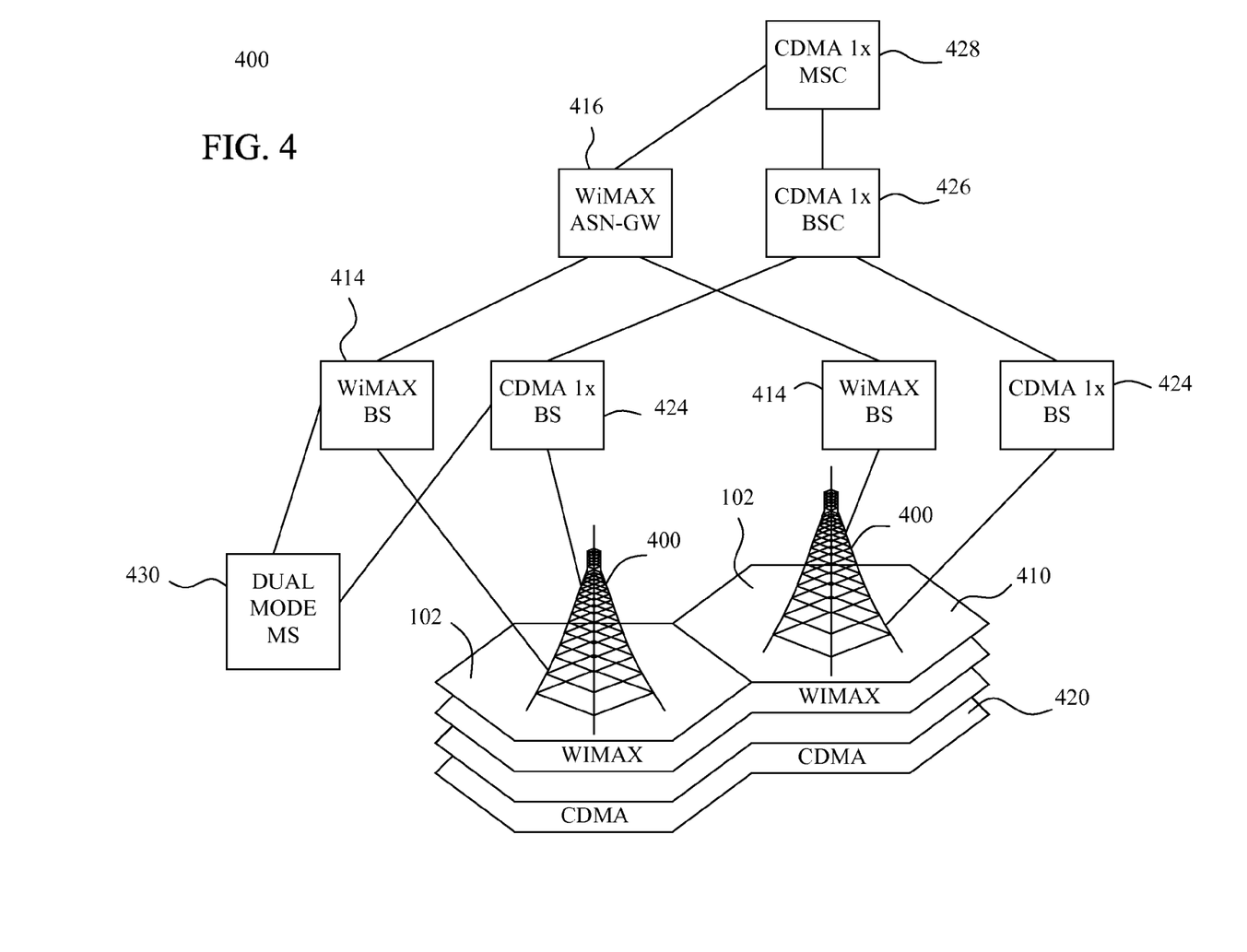
FIG. 4 illustrates a WiMAX network overlaid on a code division multiple access (CDMA) 1x network.

In the deployment of wireless services, different radio access technologies (RATs) may be combined to provide multiple services. For example, FIG. 4 illustrates a system 400 in which a mobile WiMAX network 410 may be combined with a code division multiple access (CDMA) 1x network 420 to provide broadband data service. In the system, subscribers may utilize a single dual-mode (CDMA and WiMAX) mobile station (MS) 430 to tune to the CDMA network to utilize circuit-switched voice service and tune to the WiMAX network to utilize the broadband data service.

In conventional systems, inefficient switching between the two networks may cause a reduction in throughput on either service. For example, in conventional systems, a dual-mode MS connected to a WiMAX network for broadband services would have to periodically switch to the CDMA network to check for a CDMA page message and perform CDMA registration. This periodic switching may disrupt the existing broadband data service and detract from the user experience.

Embodiments of the present disclosure, however, may help reduce such switching and avoid interruption in services by allowing one or more components of the WiMAX network to interface with one or more components of the CDMA network. For example, one or more components may provide a message tunnel for CDMA network messages targeting a MS that is utilizing the WiMAX network.

For example, embodiments may provide an interface between a WiMAX service access gateway (ASN-GW) 416 and a CDMA mobile switching center (MSC) 428 for transferring page requests between the CDMA MSC 428 and a mobile station (MS) 430 when the MS is connected to the WiMAX network. In addition, the interface may serve to transfer a registration message of the MS 430 to update the location of the MS in the CDMA network. This may reduce the frequency of network switching by the MS 430 and, consequently, improve the quality of broadband data service when the MS 430 is tuned to the WiMAX network.

As illustrated in FIG. 4, the CDMA network 420 may be overlaid with the WiMAX network 410. CDMA service may be provided to a geographic area by a plurality of hardware and software components. This geographic area may be divided into regions, referred to as cells, centered around a service tower 400. In an attempt to increase spatial efficiency, a single service tower 400 may support multiple RATs. For example, a service tower 400 may support both a WiMAX base station (BS) 414 as well as a CDMA BS 424. As described above, each BS may contain equipment for the transmitting and receiving of radio signals.

A CDMA BS 424 may contain equipment for encrypting and decrypting communications with a Base Station Controller (BSC) 426, which may provide intelligent control for multiple CDMA BSs. A BSC 426 may have tens or even hundreds of BSs under its control. The BSC 426 may handle the allocation of radio channels, receive measurements from the MSs 430, or control handovers from one BS to another BS. Further, the BSC 426 may act as a concentrator where a plurality of low capacity connections to BSs become reduced to a smaller number of connections towards the Mobile Switching Center (MSC) 428.

The MSC 428 may serve as a primary service delivery node for the CDMA network. It may be responsible for handling voice calls and text messages (SMSs), specifically, setting up and releasing end-to-end connections, handling mobility and hand-over requirements during the call, and taking care of charging and real time pre-paid account monitoring. Additionally, a MSC 428 may determine the location of a MS that is being called and may interface with a landline, such as a Public Switched Telephone Network (PSTN).

For the WiMAX network 420, the access service network gateway (ASN-GW) 416 may control multiple WiMAX BSs. The ASN-GW 416 may allocate channels, receive measurements from the MSs 430, and control handovers from one BS to another BS.

The ASN-GW 416 may be located in a manner that provides it with access to all WiMAX traffic flow through the BSs under its control. Due to its location, the ASN-GW 416 may provide an opportune location to serve as an interface between the CDMA network and the WiMAX network. For certain embodiments, the ASN-GW 416 may monitor the CDMA network for paging messages and generate WiMAX messages in response that contain an indication of the paging message. As a result, a dual mode MS with a connection to the WiMAX network 420 may be able to detect CDMA paging messages without having to switch over to the CDMA network 410, which may improve the quality of broadband data service.

Figure 5:
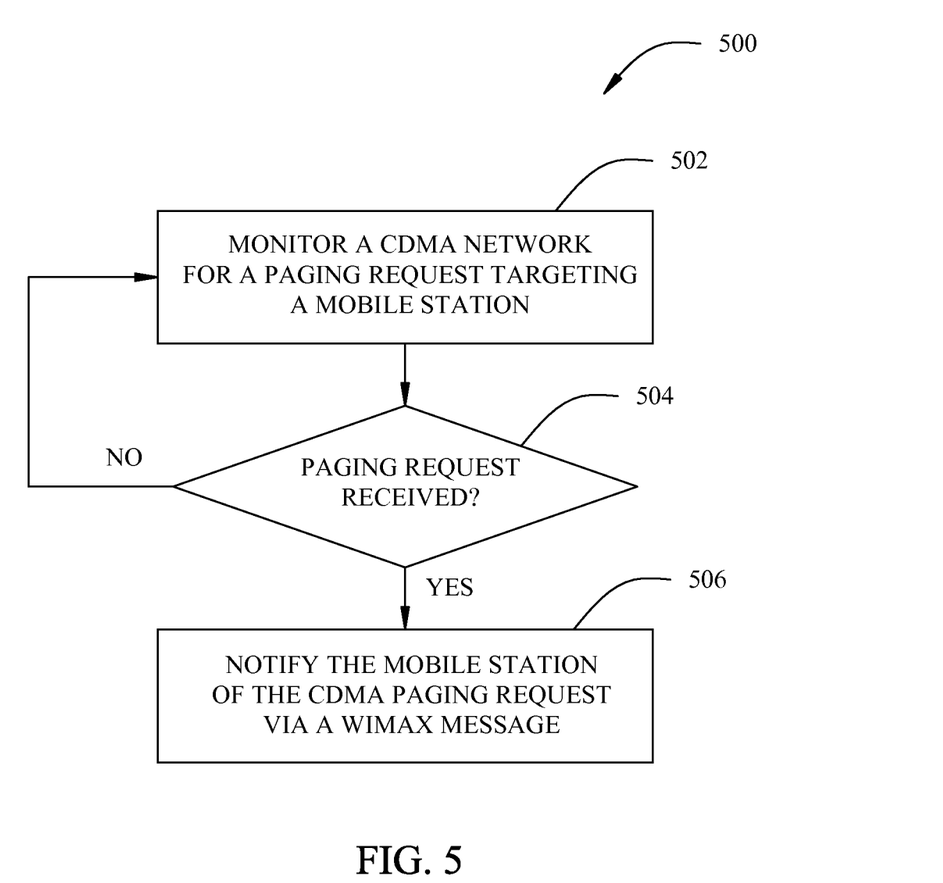
FIG. 5 illustrates example operations of a WiMAX access service network gateway (ASN-GW) that may interface with a CDMA 1x mobile switching center (MSC), in accordance with embodiments of the present disclosure.

FIG. 5 illustrates example operations 500 that may be performed, for example, at WiMAX ASN-GW 416, for transferring paging requests between the CDMA MSC 428 and the MS 430, in accordance with certain embodiments of the present disclosure. The operations 500 may be performed, for example, to allow a voice call to be made to an MS 430 connected to the WiMAX network 420.

The operations 500 begin, at 502, by monitoring the CDMA network for a paging request targeting an MS. If a CDMA paging request is received, as determined at 504, the MS is notified of the CDMA paging request via a WiMAX message containing the paging information, at 506.

In some instances (e.g. when the MS is in WiMAX idle mode), the WiMAX message sent by the ASN-GW may take the form of a WiMAX page request with CDMA page request information. In other instances (e.g. when the MS has a traffic connection in the WiMAX network), the WiMAX message sent by the ASN-GW may take the form of a WiMAX deregister request with CDMA page request information.

In some embodiments, the CDMA page request information may be included in a standard WiMAX message format using bits that are reserved under current versions of the standard. For example, MOB_PAG_ADV messages, in accordance with current versions of the 802.16 standard, have at least 6 reserved bits after a set of ACTION_CODE bits that may be used to indicate a MSC page request. Using bits reserved under the current 802.16 standard to indicate a MSC page request may facilitate implementation of embodiments of the present disclosure, while minimizing changes to the current standard.

Figure 6A:
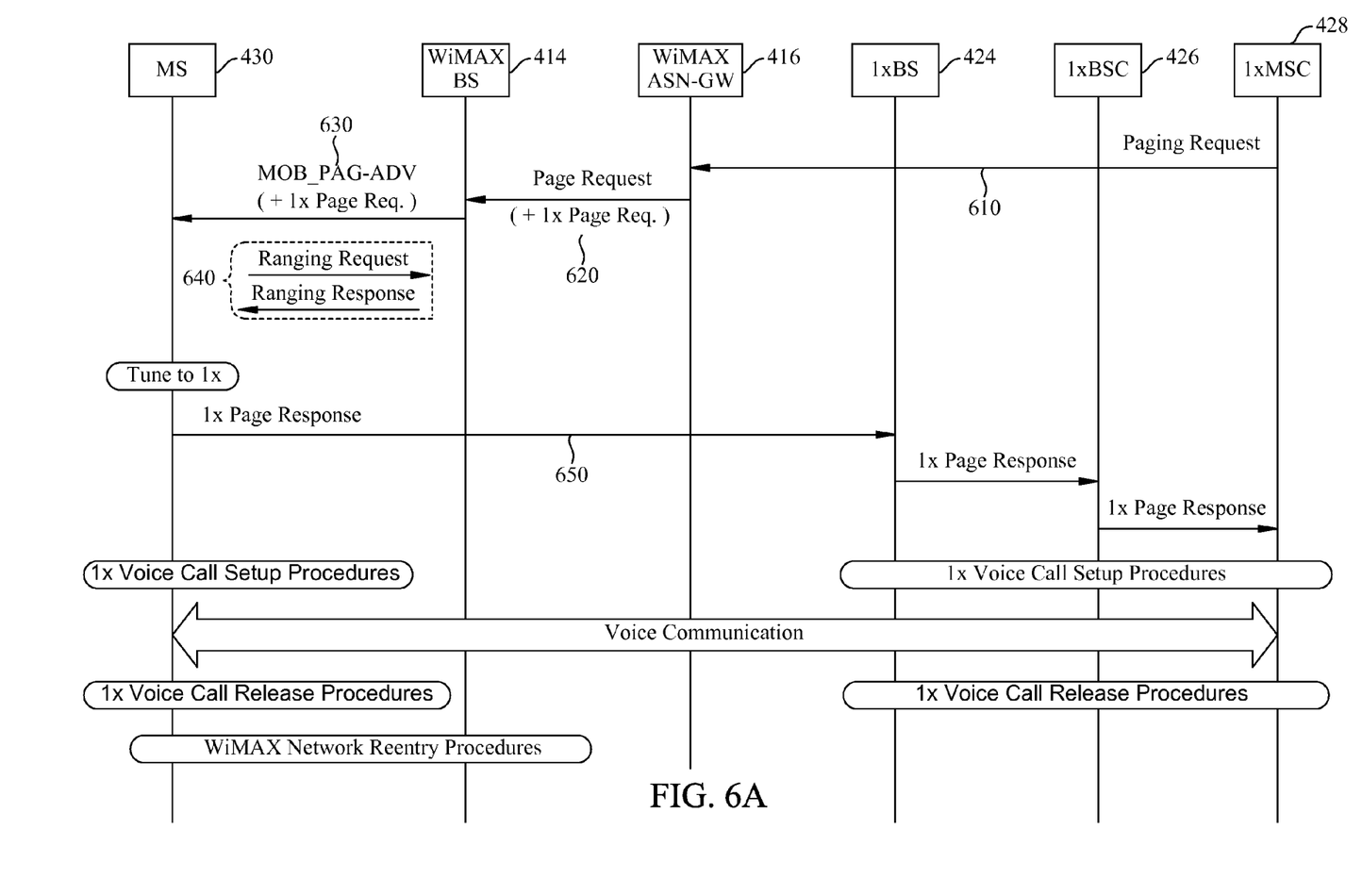
FIGS. 6A and 6B illustrate example paging procedures in response to a CDMA paging request, while the mobile station is operating in an idle mode within a WiMAX network, in accordance with embodiments of the present disclosure.
Figure 6B:
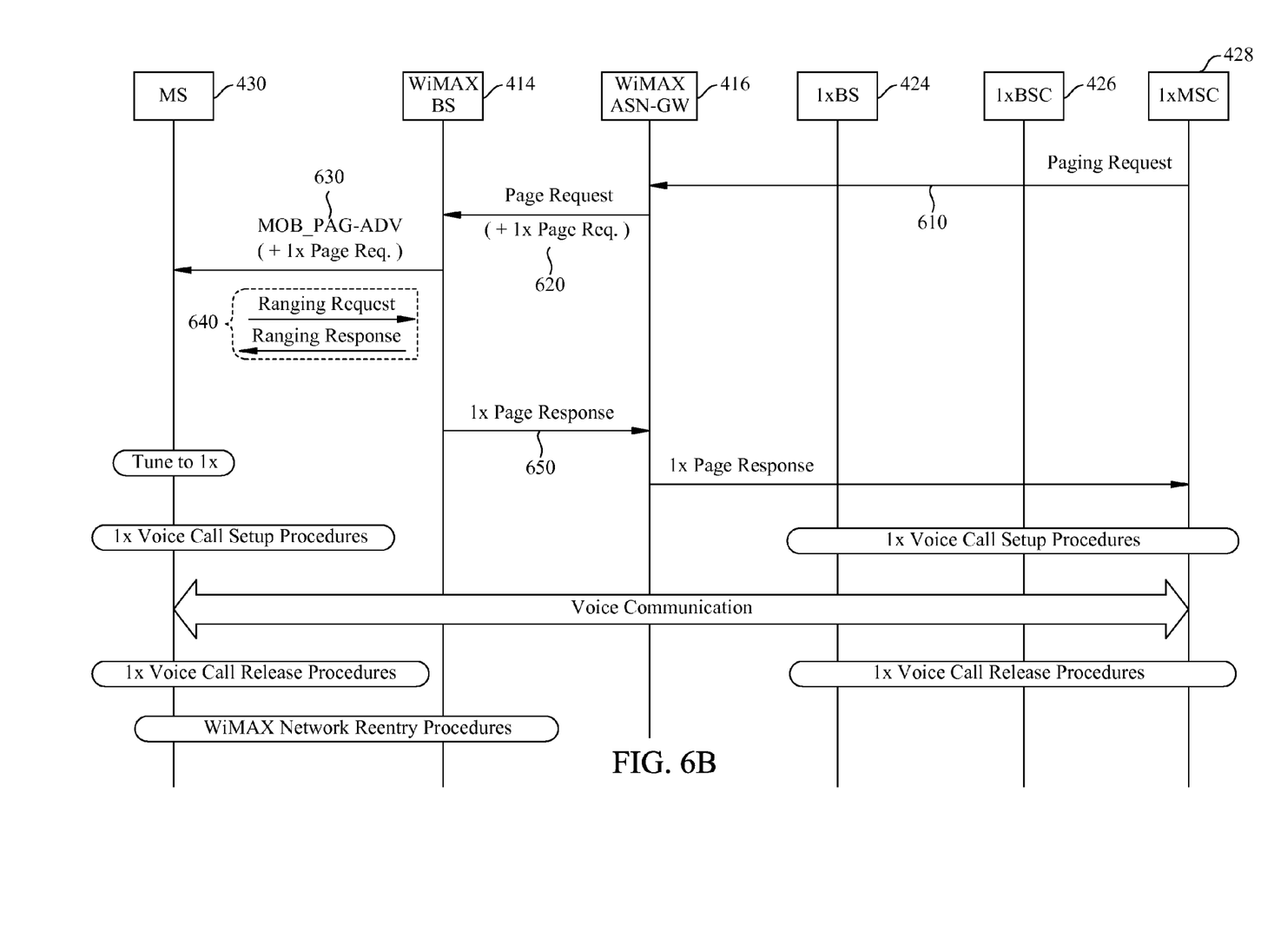

FIGS. 6A and 6B illustrate example message flow between components of the system shown in FIG. 4 corresponding to paging procedures in response to a CDMA paging request, while the MS 430 is in an idle mode with the WiMAX network.

As illustrated in FIG. 6A, the paging procedure may begin with the MSC 428 sending a CDMA paging request 610 targeting the MS 430 to the ASN-GW 416. In response, the ASN-GW 416 may generate a WiMAX paging request 620 targeting the MS 430. As illustrated, the WiMAX paging request may include the CDMA page request information and may be sent to the WiMAX BS 414.

After receiving the WiMAX paging request 620, the BS 414 may generate a MOB_PAG_ADV message 630, which may be a standard WiMAX message format modified to include the CDMA page request information. In response to the MOB_PAG_ADV message 630, the MS 430 and the WiMAX BS 414 may engage in a conventional WiMAX ranging message exchange 640.

In order to respond to the CDMA page request, the MS 430 may tune to the CDMA network and send a CDMA page response 650 to the CDMA BS 424. The CDMA page response 650 may be forwarded through the CDMA network 420. Conventional CDMA operations may follow, such as CDMA voice call setup procedures, the voice communications for the call, and subsequent call release procedures. After the completion of the CDMA operations, the MS 430 may tune back to the WiMAX network and perform WiMAX network reentry procedures.

As illustrated in FIG. 6B, for certain embodiments, the MS 430 and the BS 414 may engage in a modified ranging message exchange 640'. The ranging message exchange 640' may be modified, relative to a conventional ranging message exchange, in that the WiMAX ranging request sent by the MS 430 to the BS 414 may contain CDMA page response information. As a result, rather than the MS sending a paging response to the CDMA BS 424 as shown in FIG. 6A, the MS may send a paging response 650' to the WiMAX ASN-GW 416 as shown in FIG. 6B. The WiMAX ASN-GW 416 may then forward the paging response 650' on to the MSC 428. The MS 430 may then tune to the CDMA network and commence conventional CDMA operations, as described above.

Figure 7A:
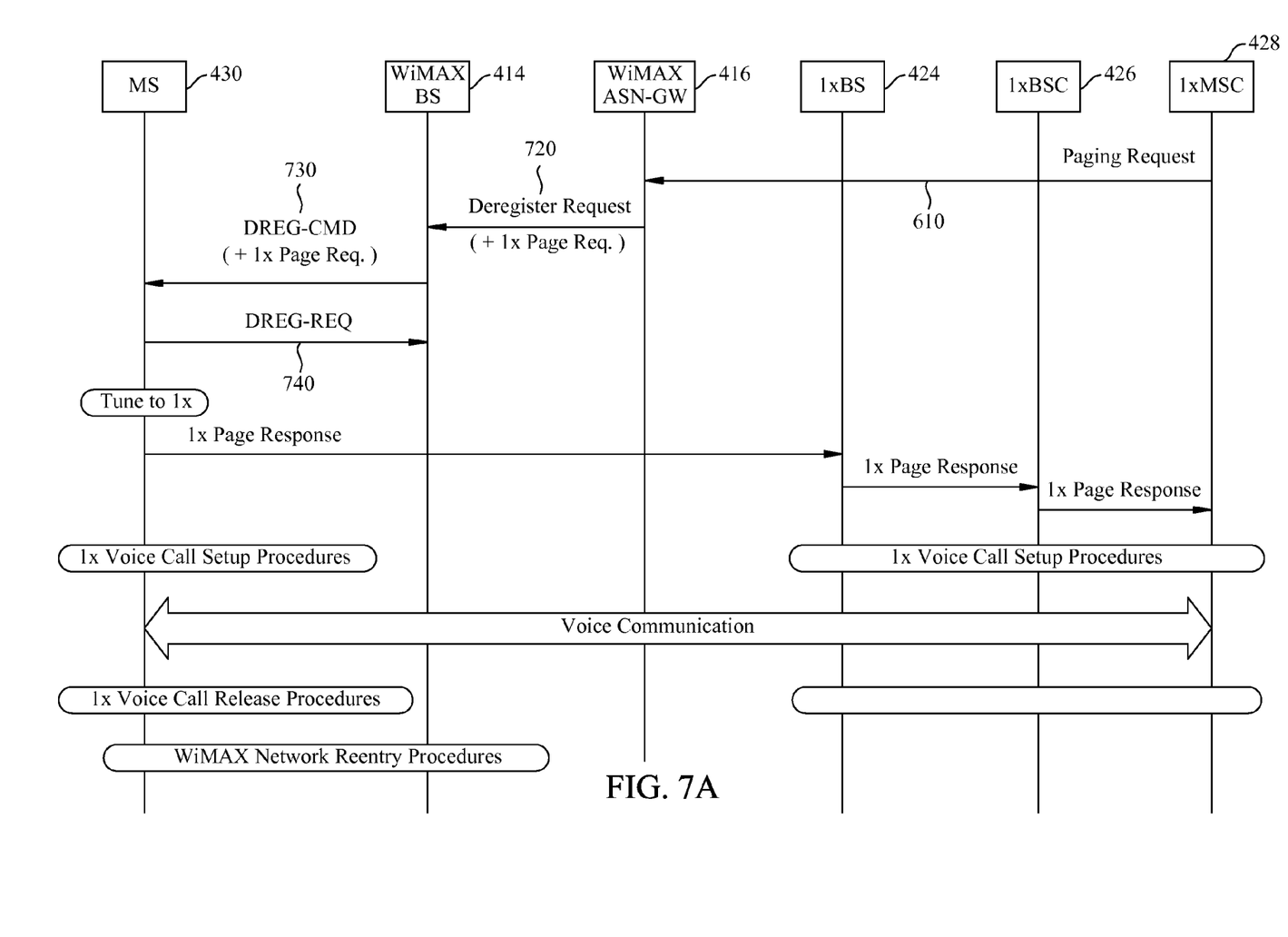
FIGS. 7A and 7B illustrate example paging procedures in response to a CDMA paging request, while the mobile station has a traffic connection with the WiMAX network, in accordance with embodiments of the present disclosure.
Figure 7B:
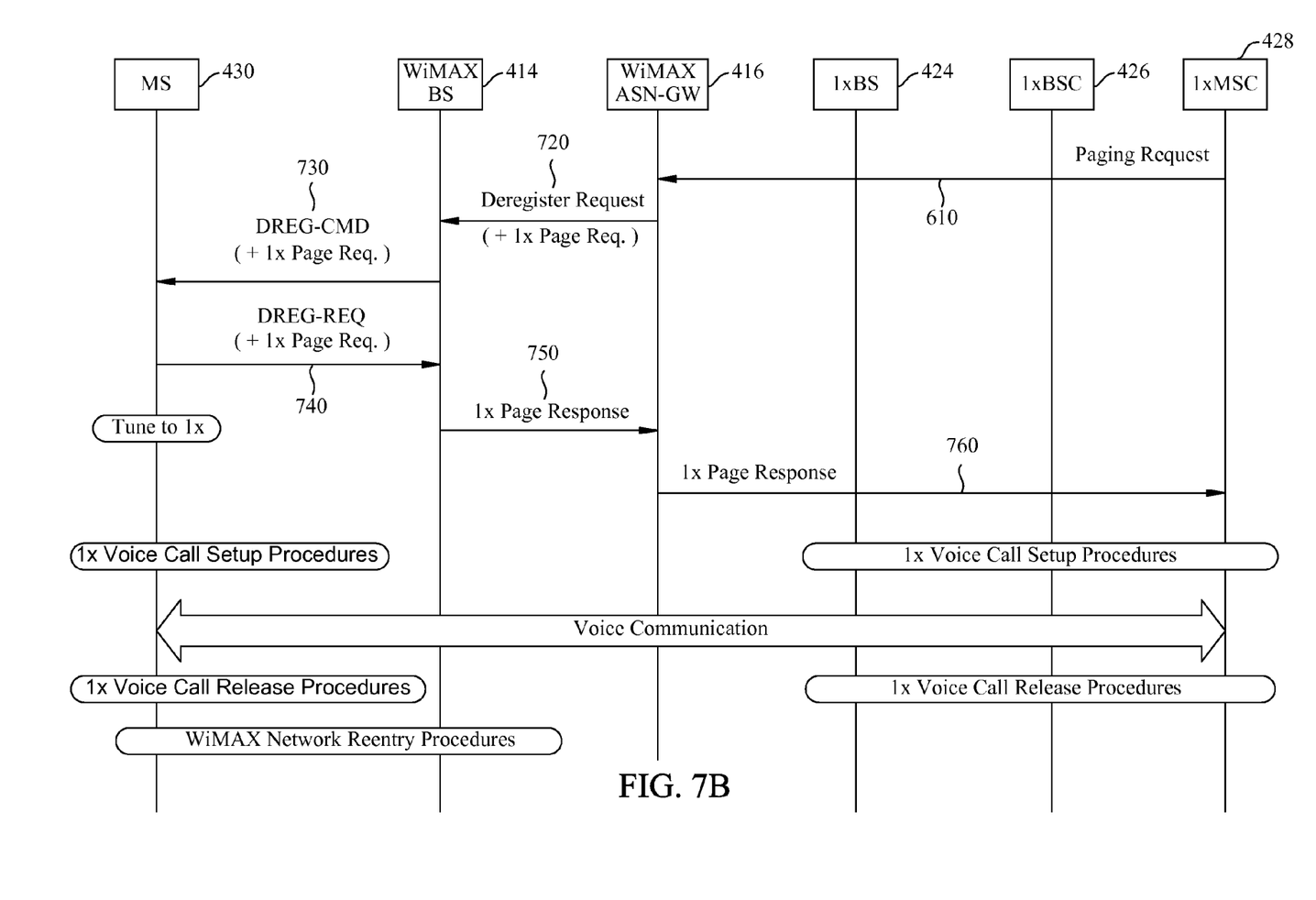

In some instances, the MS 430 may have a traffic connection with the WiMAX network when the ASN-GW 416 receives a CDMA paging request from the CDMA MSC 428. FIGS. 7A and 7B illustrate example paging procedures in response to a CDMA paging request, while the MS 430 has a traffic connection with the WiMAX network. FIG. 7A illustrates example procedures in which the MS 430 tunes to the CDMA network prior to sending a CDMA page response (as in FIG. 6A).

As illustrated in FIG. 7A, in response to receiving a paging request 610 from the CDMA MSC 428, if the MS 430 has an active traffic connection, the WiMAX ASN-GW may force the dual mode MS 430 to enter an idle mode by sending a modified deregister request 720 to the WiMAX BS 414. As illustrated, the modified WiMAX deregister request 720 may include the CDMA page request information. In response to the modified deregister request 720', the BS 414 may send a modified WiMAX DREG-CMD 730 to the MS 430. In response, the MS 430 may send a conventional DREG-REQ to the WiMAX BS 414 before tuning to the CDMA network to send a CDMA page response 650 to CDMA BS 424, after which conventional CDMA operations may follow.

For certain embodiments and in certain circumstances, the MS 430 may reject the deregister command from the WiMAX network by replying with a deregister request with a reject status and continuing to stay in the WiMAX network.

For certain embodiments, the dual mode MS 430 may respond to the CDMA paging request with a modified page response sent through the WiMAX network before tuning to the CDMA network, as illustrated in FIG. 7B. In the illustrated example, the MS 430 may send a modified DREG-REQ (containing CDMA page response information) to the WiMAX BS 414. In response, the BS 414 may send a modified WiMAX page response 750 (containing the CDMA page response information) to the ASN-GW 416. The ASN-GW 416 may then convert the modified WiMAX page response 750 to a conventional CDMA page response 760, which may be forwarded to the CDMA MSC 428.

The example embodiments described thus far have involved requests that are initiated via the CDMA network and are tunneled to a dual-mode MS 430 through the WiMAX network. For certain embodiments, however, an MS 430 may support WiMAX message types that will initiate a CDMA request.

Figure 8:
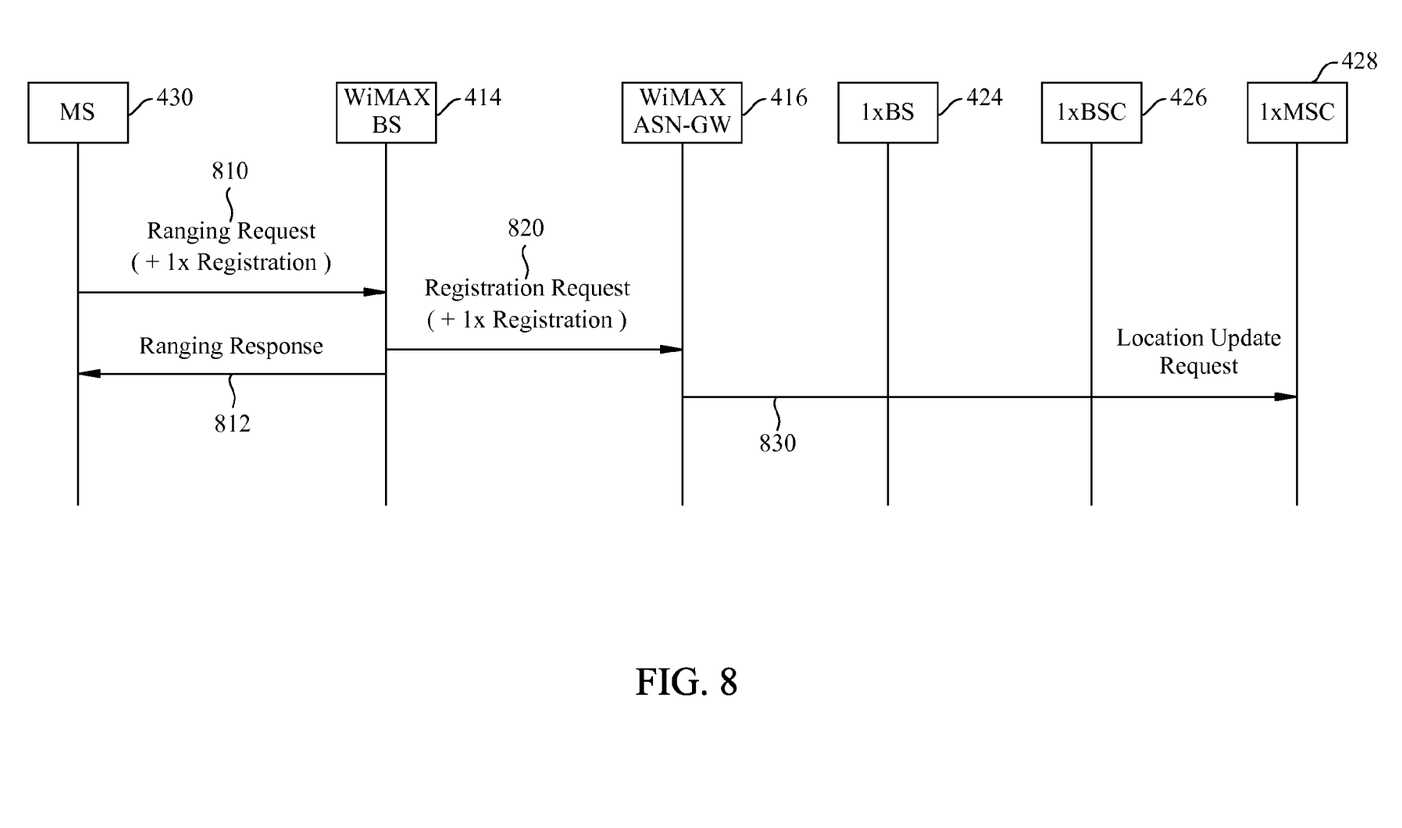
FIG. 8 illustrates an example CDMA registration procedure which may be preformed by an MS in a WiMAX network, in accordance with embodiments of the present disclosure.

For example, as illustrated in FIG. 8, the MS 430 may initiate a CDMA registration procedure via the WiMAX network, as illustrated in FIG. 8. In contrast to previously described embodiments, which had the MS respond to the CDMA network in response to a CDMA paging request, the MS may also initiate a CDMA registration procedure effectively signaling to the CDMA network that the MS 430 is with a specific WiMAX ASN-GW 416.

To initiate a CDMA registration procedure, the MS 430 (e.g., in an idle mode within the WiMAX network) send a modified ranging request 810 (including information regarding the registration request) to the WiMAX BS 414. In response, the BS 414 may respond with a conventional Ranging Response 812 and also send a modified registration request 820 to the WiMAX ASN-GW 416, which may also include CDMA registration information. In response to the modified WiMAX registration request 820, the ASN-GW 416 may send a conventional CDMA registration request 830 to the CDMA MSC 428, effectively allowing the dual-mode MS 430 to update its location within the CDMA network, without having to switch over from the WiMAX network.

Figure 5A:
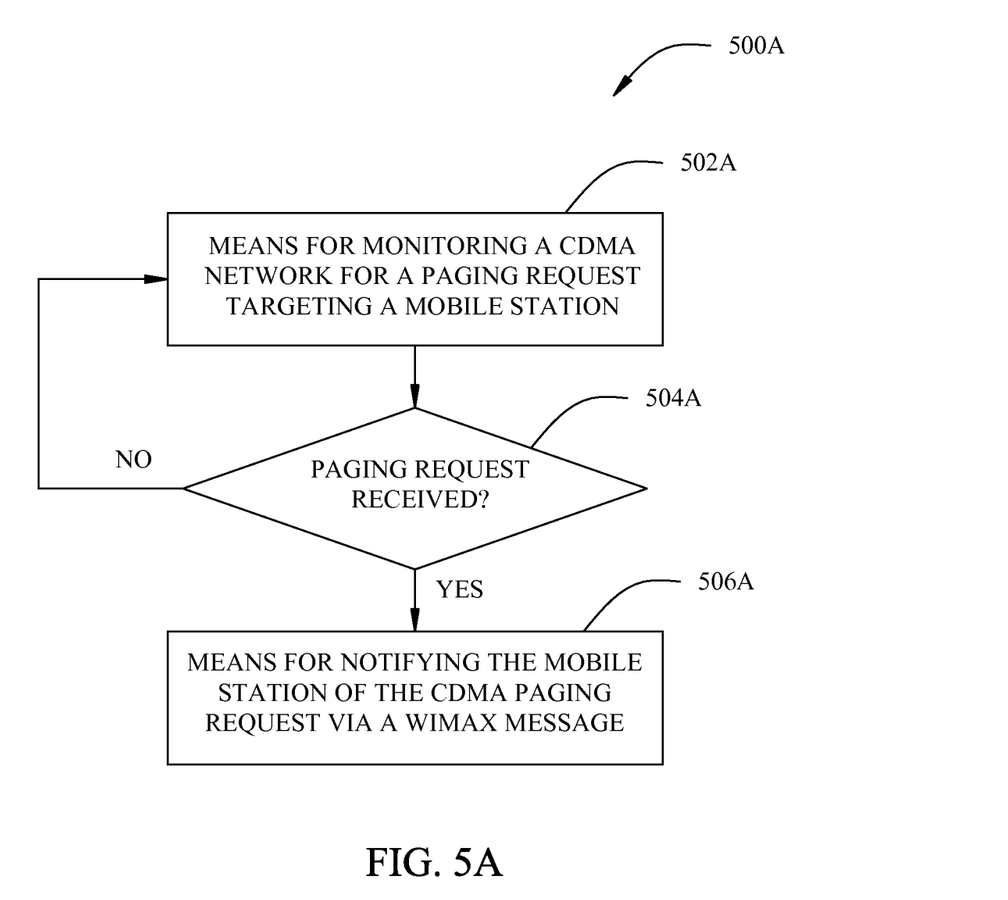
FIG. 5A is a block diagram of means corresponding to the example operations of FIG. 5 for interfacing with a CDMA 1x MSC, in accordance with embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-506 illustrated in FIG. 5 correspond to means-plus-function blocks 502A-506A illustrated in FIG. 5A.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communicating with a multi-mode mobile device that supports code division multiple access (CDMA) and orthogonal frequency division multiple access (OFDMA) communications, comprising:
   monitoring a mobile switching center (MSC) of a CDMA network directly for a CDMA paging request targeting the mobile device; and
   in response to detecting the CDMA paging request targeting the mobile device, notifying the mobile device of the CDMA paging request with an OFDMA message by transmitting an OFDMA page request to an OFDMA base station servicing the mobile device, wherein the transmitted OFDMA page request format is modified to include CDMA paging request information.

2. The method of claim 1, wherein:
   the mobile device supports OFDMA communications in accordance with one or more standards of the Institute of Electrical and Electronics Engineers (IEEE) 802.16 family of standards; and
   notifying the mobile device of the CDMA paging request with the OFDMA message paging request comprises notifying the mobile device of the CDMA paging request with an OFDMA message in accordance with the one or more standards of the IEEE 802.16 family of standards.

3. The method of claim 1, wherein the standard OFDMA message format is a standard WiMAX message format.

4. A method for communicating with a multi-mode mobile device that supports code division multiple access (CDMA) and orthogonal frequency division multiple access (OFDMA) communications, comprising:
   monitoring a mobile switching center (MSC) of a CDMA network directly for a CDMA paging request targeting the mobile device; and
   in response to detecting the CDMA paging request targeting the mobile device, notifying the mobile device of the CDMA paging request with an OFDMA message by transmitting an OFDMA de-register request to an OFDMA base station servicing the mobile device.

5. An apparatus for communicating with a multi-mode mobile device that supports code division multiple access (CDMA) and orthogonal frequency division multiple access (OFDMA) communications, comprising:
   means for monitoring a mobile switching center (MSC) of a CDMA network directly for a CDMA paging request targeting the mobile device; and
   means for notifying the mobile device of the CDMA paging request with an OFDMA message, in response to detecting the CDMA message targeting the mobile device, by transmitting an OFDMA de-register request to an OFDMA base station servicing the mobile device.

6. The apparatus of claim 5, wherein:
the mobile device supports OFDMA communications in accordance with one or more standards of the Institute of Electrical and Electronics Engineers (IEEE) 802.16 family of standards; and
the means for notifying the mobile device of the CDMA message with the OFDMA message is configured to notify the mobile device of the CDMA message with an OFDMA message in accordance with the one or more standards of the IEEE 802.16 family of standards.

7. An apparatus for communicating with a multi-mode mobile device that supports code division multiple access (CDMA) and orthogonal frequency division multiple access (OFDMA) communications, comprising:
means for monitoring a mobile switching center (MSC) of a CDMA network directly for a CDMA paging request targeting the mobile device; and
means for notifying the mobile device of the CDMA paging request with an OFDMA message, in response to detecting the CDMA message targeting the mobile device, by transmitting an OFDMA page request to an OFDMA base station servicing the mobile device, wherein the transmitted OFDMA page request format is modified to include CDMA paging request information.

8. The apparatus of claim 7, wherein the standard OFDMA message format is a standard WiMAX message format.

9. A gateway device for communicating with a multi-mode mobile device that supports code division multiple access (CDMA) and orthogonal frequency division multiple access (OFDMA) communications, comprising:
a CDMA interface for monitoring a mobile switching center (MSC) of a CDMA network directly for a CDMA paging request targeting the mobile device; and
an OFDMA interface for notifying the mobile device of the CDMA paging request with an OFDMA message, in response to detecting the CDMA paging request targeting the mobile device, by transmitting an OFDMA page request to an OFDMA base station servicing the mobile device, wherein the transmitted OFDMA page request format is modified to include CDMA paging request information.

10. The gateway device of claim 9, wherein:
the mobile device supports OFDMA communications in accordance with one or more standards of the Institute of Electrical and Electronics Engineers (IEEE) 802.16 family of standards; and
the OFDMA interface is configured to notify the mobile device of the CDMA paging request with an OFDMA message in accordance with the one or more standards of the IEEE 802.16 family of standards.

11. The gateway device of claim 9, wherein the standard OFDMA message format is a standard WiMAX message format.

12. A gateway device for communicating with a multi-mode mobile device that supports code division multiple access (CDMA) and orthogonal frequency division multiple access (OFDMA) communications, comprising:
a CDMA interface for monitoring a mobile switching center (MSC) of a CDMA network directly for a CDMA paging request targeting the mobile device; and
an OFDMA interface for notifying the mobile device of the CDMA paging request with an OFDMA message, in response to detecting the CDMA paging request targeting the mobile device, by transmitting an OFDMA de-register request to an OFDMA base station servicing the mobile device.

13. A non-transitory computer-readable medium containing a program for communicating with a multi-mode mobile device that supports code division multiple access (CDMA) and orthogonal frequency division multiple access (OFDMA) communications which, when executed by a processor, performs operations comprising:
monitoring a mobile switching center (MSC) of a CDMA network directly for a CDMA paging request targeting the mobile device; and
in response to detecting the CDMA paging request targeting the mobile device, notifying the mobile device of the CDMA paging request with an OFDMA message, by transmitting an OFDMA de-register request to an OFDMA base station servicing the mobile device.

14. The computer-readable medium of claim 13, wherein:
the mobile device supports OFDMA communications in accordance with one or more standards of the Institute of Electrical and Electronics Engineers (IEEE) 802.16 family of standards; and
notifying the mobile device of the CDMA paging request with the OFDMA message comprises notifying the mobile device of the CDMA message with an OFDMA message in accordance with the one or more standards of the IEEE 802.16 family of standards.

15. A non-transitory computer-readable medium containing a program for communicating with a multi-mode mobile device that supports code division multiple access (CDMA) and orthogonal frequency division multiple access (OFDMA) communications which, when executed by a processor, performs operations comprising:
monitoring a mobile switching center (MSC) of a CDMA network directly for a CDMA paging request targeting the mobile device; and
in response to detecting the CDMA paging request targeting the mobile device, notifying the mobile device of the CDMA paging request with an OFDMA message, by transmitting an OFDMA page request to an OFDMA base station servicing the mobile device, wherein the transmitted OFDMA page request format is modified to include CDMA paging request information.

* * * * *